(12) United States Patent
Oertel (10) Patent No.: US 8,165,964 B2
(45) Date of Patent: Apr. 24, 2012

(54) DETECTION OF COUNTERFEITED PRODUCTS BASED ON SENSOR MEASUREMENTS

(75) Inventor: Nina Oertel, Mannheim (DE)

(73) Assignee: SAP AG, Walldorf (DE)

( * ) Notice: Subject to any disclaimer, the term of this patent is extended or adjusted under 35 U.S.C. 154(b) by 311 days.

(21) Appl. No.: 12/259,549

(22) Filed: Oct. 28, 2008

(65) Prior Publication Data

US 2009/0144199 A1   Jun. 4, 2009

(30) Foreign Application Priority Data

Nov. 30, 2007  (EP) ..................................... 07023210

(51) Int. Cl.
*G06Q 20/00* (2012.01)

(52) U.S. Cl. ............ 705/64; 705/22; 705/333; 73/1.79; 701/25; 701/207

(58) Field of Classification Search ............... 705/50–79
See application file for complete search history.

(56) References Cited

U.S. PATENT DOCUMENTS

| | | | |
|---|---|---|---|
| 2005/0055287 A1* | 3/2005 | Schmidtberg et al. | 705/28 |
| 2005/0261938 A1* | 11/2005 | Silverbrook et al. | 705/2 |
| 2006/0164239 A1 | 7/2006 | Loda | |
| 2007/0118386 A1 | 5/2007 | Mueller et al. | |
| 2007/0143853 A1* | 6/2007 | Tsukamoto | 726/26 |
| 2007/0182544 A1 | 8/2007 | Benson et al. | |
| 2007/0273507 A1 | 11/2007 | Burchell et al. | |

FOREIGN PATENT DOCUMENTS

| | | |
|---|---|---|
| EP | 1517533 A | 3/2005 |
| WO | 2007/095761 A | 8/2007 |

OTHER PUBLICATIONS

EP Search Report for EP Patent Application No. 07023210.3, mailed Jun. 13, 2008, 10 pages.
Office Action for EP Application No. 07023210.3, mailed Nov. 23, 2009, 3 pages.
Office Action for EP Application No. 07023210.3, mailed Jul. 14, 2009, 5 pages.
Office Action Response for EP Application No. 07023210.3, filed Sep. 28, 2009, 12 pages.
Office Action Response for EP Application No. 07023210.3, filed on Dec. 9, 2009, 4 pages.

* cited by examiner

*Primary Examiner* — Jamie Kucab
(74) *Attorney, Agent, or Firm* — Brake Hughes Bellermann LLP (57) ABSTRACT

Implementations may include a computer system for detecting counterfeited products. The system may include a communication unit and a processing unit. The communication unit may be configured to receive a representation of sensor data being measured at different times by a sensor unit associated with a product. The processing unit may be configured to compute a deviation of the sensor data from data of a transport profile for the product and to compute from the deviation a counterfeit value representing an estimate value for the probability that the product is counterfeited.

26 Claims, 7 Drawing Sheets

| Time | Light Intensity (Lux) | Temperature (degree Celsius) |
|---|---|---|
| 12.09.2007 12:00 | 50 | 12 |
| 12.09.2007 12:01 | 52 | 12 |
| 12.09.2007 12:02 | 51 | 12 |
| ... | ... | ... |
| 24.09.2007 20:01 | 70 | 18 |

Fig. 3

| Light Intensity | |
|---|---|
| Dynamic | Absolute lux value changing more than10% within 2 minutes (2 consecutive readings at 1 minute intervals) |
| Constant Low (Night/Packaging) | <2 lux (during 2 or more consecutive reads) |
| Constant Medium (Inside building) | 2-1000 (during 2 or more consecutive reads) |
| Constant High (Outside) | >1000 (during 2 or more consecutive reads) |

Fig. 4A

| Temperature | |
|---|---|
| Dynamic | Absolute temperature value changing more than 2 degrees within 5 minutes (5 consecutive readings at 1 minute intervals) |
| Constant Low | <5 degrees(during 3 or more consecutive reads) |
| Constant Medium | 5-15 degrees (during 3 or more consecutive reads) |
| Constant High | >15 degrees(during 3 or more consecutive reads) |

Fig. 4B

| Light intensity sequence number | | | | | | | | | |
|---|---|---|---|---|---|---|---|---|---|
| 1 | Medium | Dynamic | Low | Dynamic | Medium | Dynamic | Medium | Low | Medium |
| 2 | Medium | Low | Dynamic | Medium | Dynamic | Medium | Low | Dynamic | Low |

Fig. 4C

| Item ID | Time | ReadPoint (ReaderLocation) | BusinessLocation | BusinessStep (Transaction) | Disposition (Status after reading) |
|---|---|---|---|---|---|
| 1 | 12:00, 16.08.2007 | 4 | 4 (=Rotterdam) | Shipping | In Transport |
| 1 | 14:00, 16.08.2007 | 9 | 6(=Emden) | Repacking | In Storage |
| 1 | 10:45, 17.08.2007 | 8 | 9(=Hamburg) | Receiving | In Storage |
| 2 | 12:28, 19.08.2007 | 3(=end of manufacturing line 7 in building 123) | 45(=building 7, manufacturing plant Hamburg, Company 434) | Manufactured | In transport (internal) |
| 2 | 12:45, 19.08.2007 | 23(=quality control nr. 2 in building 7 | 45(=building 7, manufacturing plant Hamburg, Company 434) | Quality Control | Transport to Packaging |
| 2 | 13:45, 19.08.2007 | 2476(=Pack Station 45, Building 34) | 7453(=Building 34, Packing Area, Hamburg, Company 434) | Packaging | Transport to Shipping |
| 2 | 14:40, 19.08.2007 | 33(=Dock door 25, Building 34) | 7453(=Building 34, Packing Area, Hamburg, Company 434) | Shipping | In transport (external) |
| 2 | 16:43, 19.08.2007 | 757(=dock door 23, building 6) | 455(=Building 6, Receiving Area, Stendahl, Company 476) | Receiving | Transport to storage |
| 2 | 16: 50, 19.08.2007 | 567(=door 45, building 6) | 455(=Building 6, Receiving Area, Stendahl, Company 476) | Entrance in Backroom | Wait in backroom |
| 2 | 17:00, 19.08.2007 | 556(=door 3455) | 455(=Building 6, Receiving Area, Stendahl, Company 476) | Entrance in Storage Area | In store |

Computer program product

510

Instructions

520

Instructions to cause method operations

Fig. 7

DETECTION OF COUNTERFEITED PRODUCTS BASED ON SENSOR MEASUREMENTS

CROSS-REFERENCE TO RELATED APPLICATION

This application claims priority under 35 U.S.C. §119 to European Patent Application EP 07023210.3, filed Nov. 30, 2007, titled "DETECTION OF COUNTERFEITED PRODUCTS BASED ON SENSOR MEASUREMENTS," which is incorporated herein by reference in its entirety.

TECHNICAL FIELD

This description relates to the field of electronic data processing and more specifically to authentication of products.

BACKGROUND

In the last years, the economy has become more and more global. In a global economy products may, for example, be manufactured in one location using components manufactured in different locations and be shipped to still different destinations. During a transport of a product, the product may be handled by different parties, for example, a manufacturer of the product, one or more transport companies, a distributor, and a dealer.

Valuable products may be targeted by certain enterprises such as product pirates to be counterfeited. In an example, a counterfeited product may be produced with a lower standard and be introduced as an authentic product in a transport chain of authentic products. The incentive to counterfeit products may be high when the difference between the production cost of the counterfeited products and the price of the authentic products is high. However, counterfeiting products may damage a manufacturer of authentic products and a party purchasing and using a counterfeited product as an authentic product. In an example, a counterfeited drug may not be as efficient as an authentic drug or may cause severe side effects. In a further example, counterfeited products may be used as parts of automobile or an airplane and break early to cause an accident.

SUMMARY

Embodiments may be used to address how to detect counterfeited products. When a counterfeited product is detected, it may be removed without causing damages and a source of the counterfeited products may be identified.

An embodiment may include a system for detecting counterfeited products. The system may use measurements of a sensor unit that is associated with the product and compare the measurements with data of a transport profile. In an example, the sensor unit may regularly measure the temperature of the environment and thus create a temperature history of the past of the product.

The system may be used to reliably detect counterfeited products. It may be difficult to counterfeit dynamic measurements of a sensor unit. Obtaining a product may be sufficient to produce a counterfeited product but may not be sufficient to counterfeit measurements of a sensor unit. Furthermore, when measurements of an authentic sensor unit have been obtained, counterfeiting a sensor unit may be difficult. A counterfeited product with an authentic sensor unit may require imitating a transport path of an authentic product and predicting when a counterfeited product is put together with authentic products. Using a counterfeited sensor unit may also require predicting when a counterfeited product is put together with authentic products. The counterfeited sensor unit may further be required to take correct measurements for the time when the counterfeited sensor unit is together with authentic sensor units. Furthermore, the system may be used to check regularly and in an automated way for counterfeited products.

A further embodiment may include a method for detecting counterfeited products. The method may include comparing measurements of a sensor unit to data of a transport profile. The method may be reliable for reasons for which the system for detecting counterfeited products also is reliable.

A further embodiment may include a computer program product for detecting counterfeited products. The computer program products may share features with the method for detecting counterfeited products and may be reliable for reasons for which the method is reliable.

The details of one or more implementations are set forth in the accompanying drawings and the description below. Other features will be apparent from the description and drawings, and from the claims.

DETAILED DESCRIPTION

The following description of examples includes details for illustrating embodiments and is not intended to limit the scope of the embodiments or to be exhaustive. For purposes of explanation, specific details are set forth in order to provide a thorough understanding of example embodiments. A person skilled in the art may appreciate that further embodiments may be practiced with details that differ from the specific details.

Figure 1:
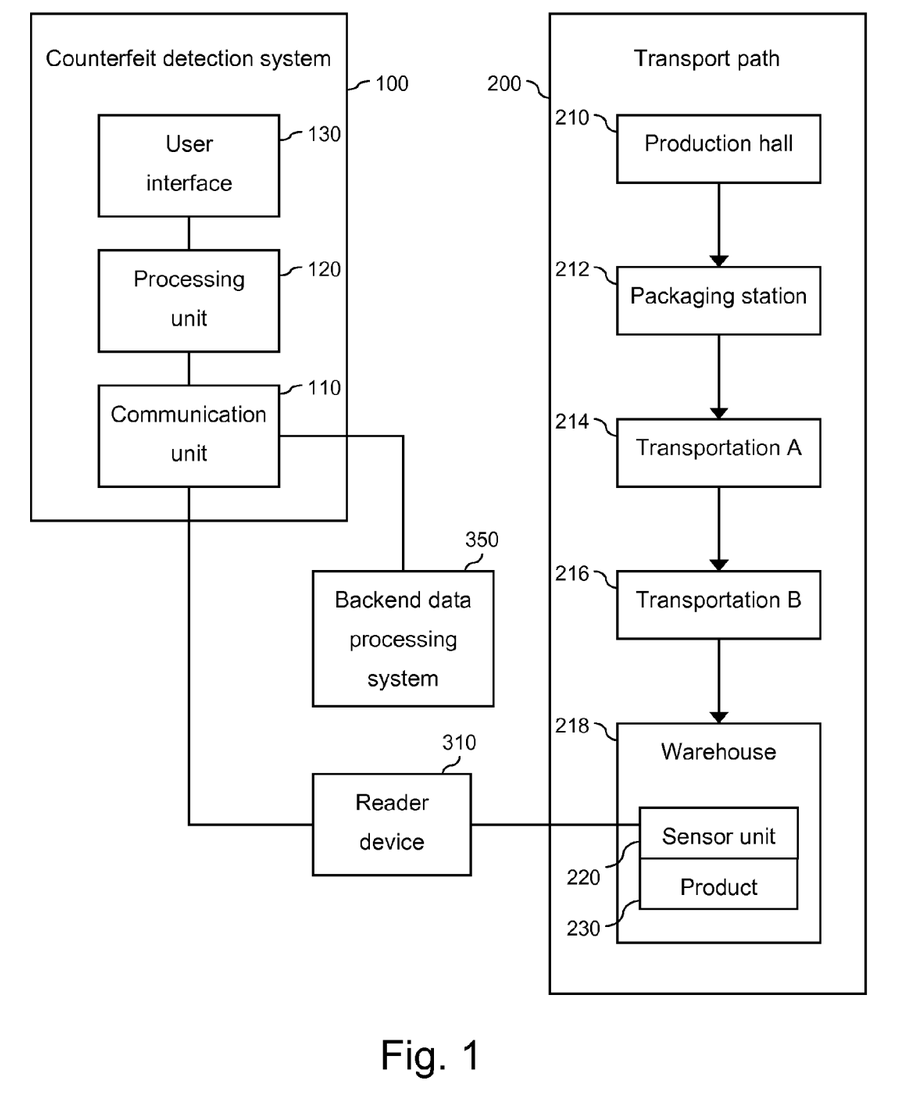
FIG. 1 is a block diagram of an example scenario with an example system according to an embodiment.

FIG. 1 is a block diagram of an example scenario with an example system 100 according to an embodiment. The system 100 may be a computer system 100 for detecting counterfeited products. The system 100 may include a communication unit 110, a processing unit 120, and a user interface 130. The scenario further includes in a different scale a transport path 200 with a production hall 210, a packaging station 212, transportation A 214, transportation B 216, a warehouse 218, and a sensor unit 220 associated with a product 230. Further elements of the scenario include a reader device 310 and a backend data processing system 350. Lines linking elements represent communicative couplings configured to exchange data in either direction between the linked elements.

In an example, the sensor unit 220 may have been associated with the product at the beginning of the transport path 200, that is, in the production hall 210. In an example, the sensor unit 220 may be a sensor node with a sensor for measuring and data processing means. The association may be tamper evident or tamper proof so that the sensor unit 200 may be difficult to be removed and used for counterfeited products. In an example, the sensor unit 220 may be associated with the product by an adhesive label, by a metallic wire or by a common sealed wrapping or package. The sensor unit 220 may be configured to be activated and such an activation may be done prior to or following an association with the product 230.

The sensor unit 220 may have a sensor to make measurements at different times and the sensor unit 220 may record the measurement results. In an example, the measurement results may be processed further and may be provided as sensor data. Such further processing may reduce memory requirements for storing the sensor data. In a different example, the measurement results may be identical to the sensor data. In an example, the sensor data may be a result of a frequent and regular measurement taking place every minute or every one hundred minutes. In a further example, the sensor data may be a result of measurements at predefined times or time differences that may vary. The times at which the measurements have taken place may be recorded and provided with the sensor data to an authorized system. The sensor data may describe measurement results of physical quantities such as temperature, light intensity, acceleration, humidity, or positioning data from a global positioning system.

During the transport along the transport path, the sensor unit 220 may create the sensor data to provide an accurate description of the transport path with respect to the measured quantity. In an example, the sensor unit 220 may stay in the production hall 210 at a constant temperature for a certain number of hours and may then be transported to the packaging station with a slightly different constant temperature. Following this, the sensor unit 220 may be able to record changing temperatures during a loading on a vehicle for transportation A 214 and a constant temperature during transportation A 214. A reloading and following transportation B 216 may have a temperature progression that may be characteristic or easy to identify. This may be the case when a vehicle such as an airplane is used. Further vehicles may include for example trucks, ships, or trains. From an identification of the vehicle and a time of transportation a transport distance may be computed. The transport distance may be verified with location data about the transport path accessible for example in the backend data processing system 350.

When the sensor unit 220 arrives with the product 230 in the warehouse 218, the reader device 310 may transmit a request for the sensor data to the sensor unit 220. Accordingly, the sensor unit 220 may transmit a representation of the sensor data to the reader device 310 that sends the representation to the communication unit 110. The transmitting of data between the sensor unit 220 and the reader device 310 may be done using radio frequency signals or using a cable that may be plugged into the sensor unit 220.

The communication unit 110 may be configured to receive a representation of sensor data. The representation of the sensor data may be identical to the sensor data or may be an encryption of the sensor data. The communication unit 110 may forward the representation of the sensor data to the processing unit 120.

The processing unit 120 may be configured to compute a deviation of the sensor data from data of a transport profile for the product 230. In an example, the transport profile for the product 230 may be directly assigned to a unique product specification of the product 230. In a different example, the processing unit 120 may be configured to identify the transport profile by identifying a class representing the product 230 meaning a class to which product 230 belongs and by using an assignment of the transport profile to the class. The processing unit 120 may be configured to compute from the deviation a counterfeit value representing an estimate value for the probability that the product 230 is counterfeited.

When a class is used to identify the transport profile for the product 230 the class may be assigned to a property related to the product 230. In an example, such a class may be any one of the following classes: a class assigned to a product type of the product 230, such as a product name, product class, a batch number, or product number of the product 230; a class assigned to one or more locations of a transport path of the product 230, such as a production location or a destination; a class assigned to an authentication requester having read the sensor data from the sensor unit 220, such as a party operating the warehouse 218 and the reader device 310; and a class assigned to manufacture data of the product 230, such as an identifier of the manufacturer or a route.

Furthermore, the class may be assigned to one or more events of the transport path of the product 230. The events may have been recorded by a radio frequency identifier (RFID) reader device reading an RFID tag associated with the product 230. Such RFID readers may have been passed in one or more positions of the transport path 200. In an example, the read data of the RFID readers may be sent with an identifier of the RFID readers to the backend data processing system 350 that may store the received data. The received data may include a unique identifier of the tag associated with the product 230 and the backend data processing system 350 may be able to create a transport course of the product 230 and identify events of the of the product 230. In a further example, events of the transport path of the product 230 may be identified using a discovery service of the EPC global Network for finding and querying readings from EPCIS (electronic product code information service) servers using a unique identifier. In a different example, the events also may be recorded with a matrix barcode reader of barcodes that store unique serial numbers for products. More generally, a method may be used that includes identifiers that are able to uniquely identify each single product and a reading device that is configured to capture the identifiers.

In further examples, a class may also be assigned to a combination of properties related to the product 230.

The user interface 130 may be configured to display the counterfeit value computed by the processing unit 120 to a user. The user interface 130 also may display the deviation of the sensor data or a quantity based on the sensor data from data of the transport profile. The user interface 130 may, for example, display when the deviation is larger than a certain parameter and offer a possibility to change the parameter so that the counterfeit value changes. Such a change may be, for example, from a counterfeit value indicating a potential counterfeit product to a counterfeit value indicating an authentic product. With the user interface 130, a user may be able to modify results of the counterfeit check and adjust parameters for future checks.

In an example, the processing unit 120 may be configured to compute the deviation by comparing the sensor data to a threshold value of the transport profile or stored in the transport profile. Accordingly, the processing unit 120 may compute the counterfeit value by specifying a first counterfeit value qualifying the product 230 as possibly counterfeited when the sensor data is non-compliant with the threshold value.

The threshold value may be any one of the following values: a minimum value for the sensor data, a maximum value for the sensor data, a minimum value for the average of the sensor data, and a maximum value for the average of the sensor data. The threshold values may, for example, be determined by manual measurements that are entered manually or may be computed in an automated way using values from one or more sample sensor units. The threshold values may be parameters that a user may be able to see, set, and modify with the user interface 130. Using such threshold values may render a check for detecting a counterfeit product fast. In an example, a sensor unit may be configured to measure a combination of quantities such as temperature and light intensity. A counterfeit detection may include processing the sensor data for each quantity separately. In such cases, different threshold values may be defined for each measured quantity and a non-compliance with a single threshold value of one quantity may result in a qualification of the product as counterfeited or possibly counterfeited.

The processing unit 120 may be further configured to compute the threshold value by receiving sensor data of a plurality of sensor units and by identifying the threshold value with a statistical value of the sensor data of the plurality of sensor units. Such statistical values may be average values from a plurality of sensor units for a certain time or a comparable time and standard deviations from average values. Standard deviations may be used as units to express acceptable deviations of sensor data of the sensor unit 220 from average values. In an example, each sensor unit of the plurality of sensor units may be associated to a product. In an example, during a learning phase, sensor data from 10,000 sensor units associated to products may be represented by one or more different classes. Following a classification of the products, average values and standard deviations of sensor units may be computed from products of an identical class. The classification of the products may be according to one or more properties of the products or properties of the events recorded for the products. In an example, a certain percentage of statistical outliers may be ignored and new average values and new standard deviations may be computed without the outliers. In an example, a parameter may be defined for an acceptable deviation of the average of the sensor data of the sensor unit 220 from the new average value. The parameter may be expressed using the new standard deviation. In an example, an average of the sensor data of the sensor unit 220 more than two new standard deviations away from the new average value may give a result indicating that the product 230 is a counterfeited product. In an example, additional learning phases may be used following a main learning phase to update data of the transport profile.

In a further example, the processing unit 120 may be configured to compute the deviation by comparing a mapping of the sensor data to mapping values of the transport profile. As a person skilled in the art may appreciate, using such mappings of the sensor data may be efficient to analyze relevant time correlations between sensor data of the sensor unit 220 and mapping values of the transport profile. The processing unit 120 may be configured to compute the counterfeit value by specifying a second counterfeit value qualifying the product as possibly counterfeited when the differences between mapped sensor data and the mapping values of the transport profile are outside a predefined range.

The processing unit 120 may be further configured to compute the mapping values by receiving sensor data of a plurality of sensor units and by identifying each one of the mapping values with a mapped average value of the sensor data of the plurality of sensor units. In an example, the mapping of the sensor data and the average values may be computed by using a continuous mapping function that approximates the average values of the sensor data of the plurality of sensor units. Such a continuous mapping function may be obtained with a fast Fourier transformation or a wavelet transformation of the average values. The continuous mapping functions may be normalized to a standard time interval so that sensor data of different sensor units may be compared on a normalized time scale.

In a specific example, parameters may specify a range for acceptable deviations for the result of an expression such as: SUM $(abs(f(x\_i)-f(y\_i)))$, over all i, wherein $x\_i$ is an average value computed for the plurality of sensor units at time i, and wherein $y\_i$ is the value of the sensor data of the sensor unit 220 at time i; the function f may be a continuous mapping function obtained by a fast Fourier transformation or a wavelet transformation of the average values. The range may be specified using standard deviations for the sum based on sensor data of the plurality of sensor units.

In a further example, the processing unit 120 may be configured to compute the deviation by comparing representative values of consecutive values of the sensor data to segment values of the transport profile. The processing unit 120 may be configured to compute the counterfeit value by specifying a third counterfeit value qualifying the product as possibly counterfeited when a predefined number of differing representative values and segment values is reached. In an example, the number of differing representative values and segment values, meaning the differences between the representative values and the segment values, may be computed by computing the edit-distance between a sequence of the representative values and a sequence of the segment values.

The processing unit 120 may be further configured to compute the segment values by receiving sensor data of a plurality of sensor units and by identifying each one of the segment values with a certain value. The certain value may be configured to represent consecutive values of sensor data of each sensor unit of the plurality of sensor units.

The processing unit 120 may be configured to compute a segment by accessing data describing events of a transport path of a sample product. The data describing events may be recorded by RFID reader devices reading a tag associated with the sample product. The data describing events may also include identifiers of the RFID reader devices. Computation of a segment may include defining a segment as being limited by two events of the transport path. In an example, data describing events may be may be received from a plurality of sample products each of which may be associated with a sensor unit of the plurality of sensor units. The data describing events may be sent from the RFID reader devices to the backend data processing system 350 that stores the data describing events in a systematic way. The systematic way may for example allow for an efficient retrieval of events related to a sample product.

In an example, different counterfeit values computed with different data of a transport profile may be combined. In an example, the first counterfeit value, the second counterfeit value and the third counterfeit value may be added with different weights according to reliability values of the methods and the sum may be used for the estimate value.

The system 100 with the communication unit 110, the processing unit 120, and the interface unit 130 may include as hardware a computer system. Such a computer system may be, for example, a personal computer (PC), a server, a plurality of servers configured to execute software programs, or a mainframe computer system. The system 100 may include a client and a server related according to a client server architecture or may include one or more computers arranged in a peer-to-peer architecture or a distributed architecture. In a further example, the system 100 may include a plurality of individual computer systems that are connected by the Internet or by an intranet of an entity such as for example a company or an organization.

The hardware of the system 100 may run, for example by hosting and executing, a software program that configures the system 100 to have features according to an embodiment. Components or units of the system 100 may include software units that represent encapsulated or distributed instructions. Such software units may be executed by the hardware of the system 100 and execution may provide features of components of the system 100 according to an embodiment. Furthermore, components of the system 100 may include coding pieces that are organized in a way that is different from the components. In an example, coding pieces of one component may be a part of different coding modules such as function modules or classes. In a further example, coding pieces of different components may be a part of an identical coding module. One or more components of the computer system 100 may be designed as Web applications.

Figure 2:
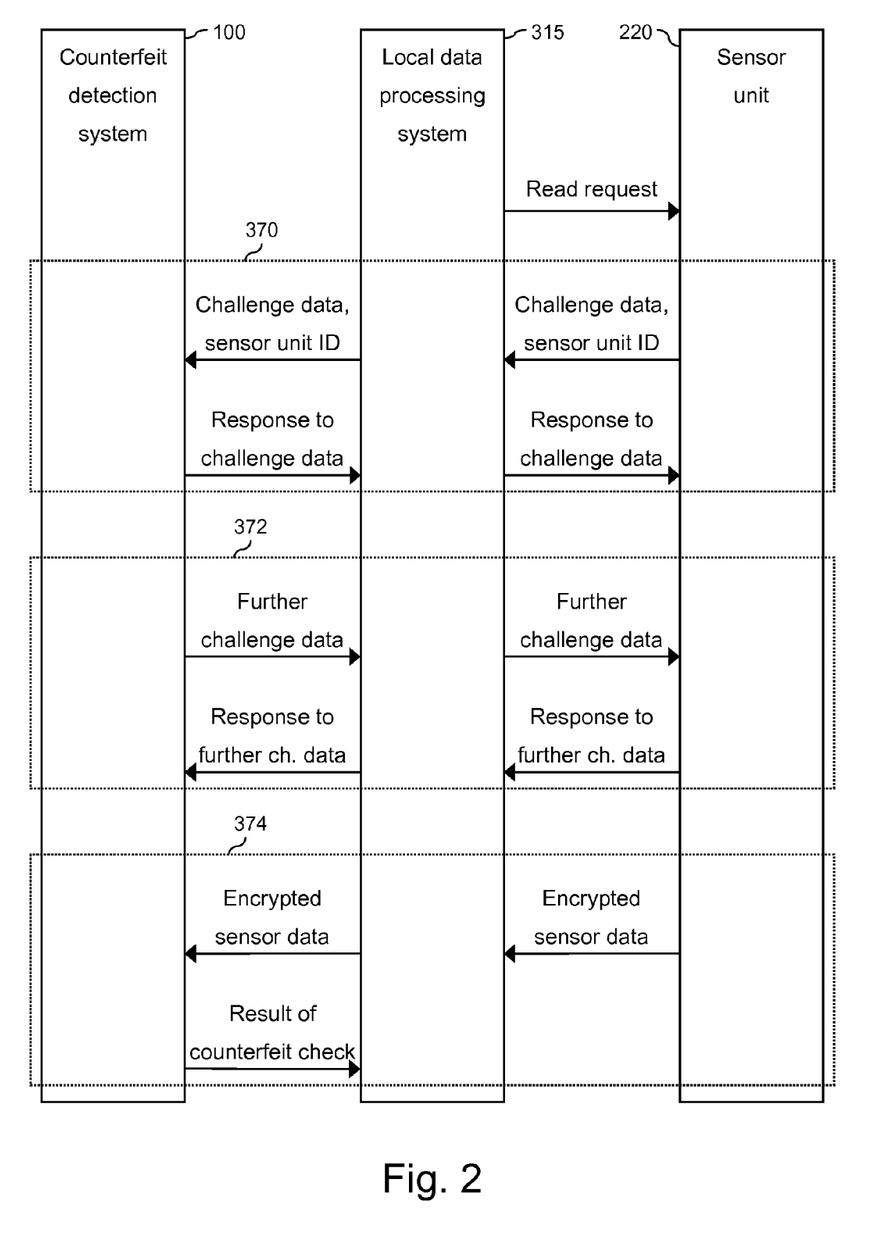
FIG. 2 is a block diagram of an exchange protocol with an example system according to an embodiment.

FIG. 2 is a block diagram of an exchange protocol with an example system 100 according to an embodiment. The participants of the exchange protocol are the counterfeit detection system 100, a local data processing system 315, and the sensor unit 220. The exchange protocol may include a first authentication protocol 370, a second authentication protocol 372, and a protocol 374 for counterfeit detection. In further examples, the order of the protocols may be different and data exchanges of one protocol may take place in between data exchanges of a different protocol. In still further examples, the first authentication protocol 370 or the second authentication protocol 372 may not be a part of an exchange protocol.

The local data processing system 315 may include or have access to the reader device 310 configured to communicate with the sensor unit 220 in both directions. In an example, the exchange protocol may start with a read request from the local data processing system 315 to the sensor unit 220. A reason for the read request may be a desire to authenticate the product 230 to which the sensor unit 220 is associated.

The first authentication protocol 370 may be executed to authenticate an authority of the local data processing system 315 to read the representation of the sensor data of the sensor unit 220. This may be used to protect the sensor data of the sensor unit 220 against unauthorized access. In case of a failure of the authentication, the sensor unit may be configured to refuse transmitting the representation of the sensor data.

For this, the processing unit 120 may be configured to participate in the first authentication protocol 370 by using the local data processing system 315 and the communication unit 110 to transmit protocol data. This also may be valid for further data exchanges between the processing unit 120 and the sensor unit. The processing unit 120 may be configured to receive challenge data from the sensor unit 220 and generate response data. The response data may be generated with a cryptographic function from the challenge data and an identifier of a secret key. In an example, identifiers of such secret keys may be identical to the secret keys. This may be true for all secret keys used in a scenario. The secret key may be accessible to the sensor unit 220. With the challenge data, an identifier (ID) of the sensor unit 220 may be sent so that the processing unit 120 may be configured to identify the secret key. In a different example, an identification of the secret key may include reading an identifier of a RFID tag of the product 230 and using an assignment of the secret key to the identifier of the RFID tag. The processing unit 120 may be configured to send the response data with the response to the challenge data to the sensor unit 220. In an example, the identifier of the sensor unit 220 may be sent with every data exchange between the counterfeit detection system 100 and the sensor unit 220.

In an example, the processing unit 120 may compute the response from a value g ([key], [challenge data]) using the cryptographic function g with [key] as the encryption key. In an example, the cryptographic function g may be according to standard definition 802.15.4 (by the Institute of Electrical and Electronic Engineers (IEEE)) based on the 128-bit Advanced Encryption Standard with symmetric keys. In a further example, a MISTY algorithm or further different algorithms may be used for encryption of data when the sensor unit 220 is involved in the encryption. The sensor unit 220 may compute the same value and compare the result with the received response. In case of identical values, the sensor unit 220 may decide that the read request is authorized and provide the representation of the sensor data. In an example, the challenge data may be computed with a further cryptographic function as [challenge data]=h (key, [original challenge data]). In such a case, the processing unit 120 may use the cryptographic function to decrypt the challenge data and to compute the [original challenge data] for the response. The challenge data may be generated using pseudo-random value generators or using a representation of the current time. In a further example, the processing unit 120 may further sign the response data with a private key of a public key encryption system. The sensor unit 220 may then request a public key for example from the local data processing system 315 and verify the signature. For public key encryption systems, any one of the RSA, ECC, or DSS algorithms may be used or any other algorithm.

The second authentication protocol 372 may be used to authenticate the sensor towards the counterfeit detection system 100. For this, the processing unit 120 may be configured to participate in a further authentication protocol by sending further challenge data to the sensor unit 220 through the local data processing system 315. The processing unit 120 may be configured to receive further response data from the sensor unit 220 to verify that the further response data are generated with a further cryptographic function. The further cryptographic function may encrypt the further challenge data and an identifier of a further secret key accessible to the sensor unit 220. In an example, the second authentication protocol 372 may be identical to the first authentication protocol 370 with the roles of the counterfeit detection system 100 and the sensor unit 220 exchanged. In a further example, the second authentication protocol 372 may be fundamentally different from the first authentication protocol 370.

Following successful authentications, the protocol 374 for counterfeit detection may be executed. In a different example, the protocol 374 for counterfeit detection may be started without any authentication protocols directly following the read request from the local data processing system 315 to the sensor unit 220. In such a case, the encrypted sensor data may be sent with the identifier of the sensor unit 220 or with further data about the sensor 220, the product 230, or events of the transport path 200. In a further example, the representation of the sensor data may be identical to the sensor data so that a decryption may not be required. The identifier of the sensor unit 220 or further data may still be sent to the counterfeit detection system 100.

For participating in the protocol 374 for counterfeit detection, the processing unit 120 may be configured to decrypt the representation of the sensor data with a key of an encryption system. In an example, the key of the encryption system may be the public key of a public key encryption system. The key of an encryption system may be identifiable using the sensor unit identifier. The representation of the sensor data may be an encryption of the sensor data generated by the sensor unit 220 from the sensor data with a secret key of the encryption system. The secret key may be configured to encrypt data to generate encrypted data that may be decrypted with the key of the encryption system used by the processing unit 120. The encrypting and decrypting may be executed using encryption functions according to standard definition 802.15.4 (by IEEE), according to MISTY algorithms or further different algorithms known in the art.

Figure 3:
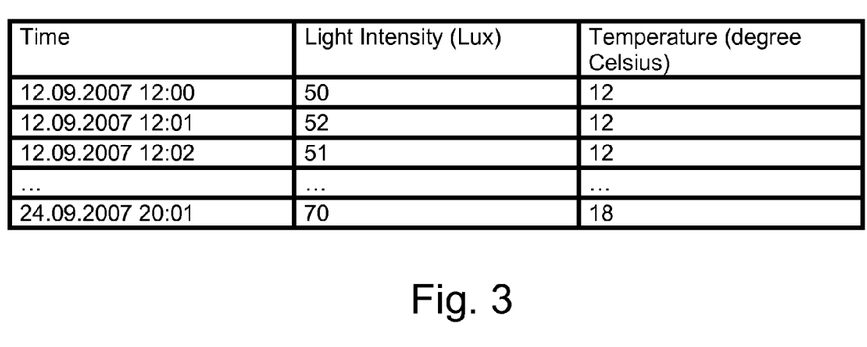
FIG. 3 is a table of example sensor data with measurements of a sensor unit.

FIG. 3 is a table of example sensor data with measurements of a sensor unit. The sensor unit may include two different sensors, one measuring the light intensity of the environment and the other one measuring the temperature of the environment. The sensor data further include the times at which the measurements have been taken. In a further example, time specifications may not be recorded or may not be a part of the sensor data. This may be so because time specifications may not be required for the analysis or may be accessible using an identifier of the sensor unit. In an example, the sensor unit may be known to record measurements every minute so that a time when the sensor data have been transmitted from the sensor unit to a reader device may be sufficient.

Figure 4A:
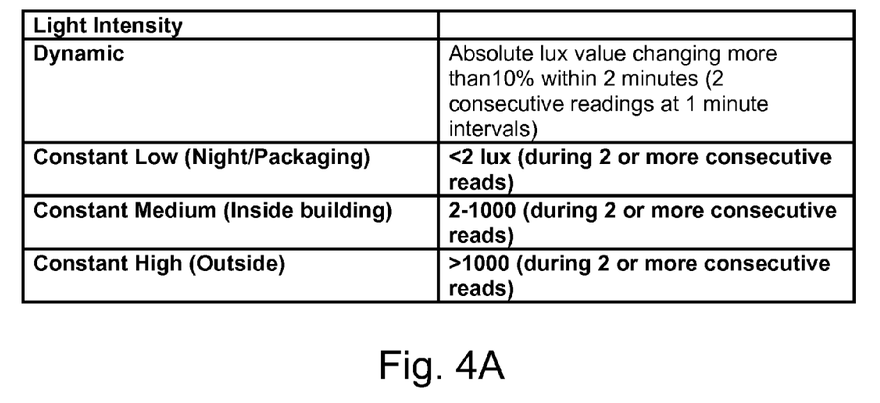
FIG. 4A is a table with an example classification of light intensity values.

FIG. 4A is a table with an example classification of light intensity values. Such a classification has classification values for the light intensity that may be used as segment values. The segment values may represent consecutive light intensity values of sensor data. The classification may be used for sensor data of a plurality of sensor units during a learning phase or for sensor data of a sensor unit that is used in a counterfeit detection check. In an example, when measurements do not comply with the classification values, classification values may be selected that describe the measurements in the closest way. In an example, measurements may not comply with classification values when they are outside ranges or criteria of all classification values.

In an example, a high light intensity may represent a stay in a manufacturing hall, a medium light intensity may represent a storage in a storage area, a low light intensity may represent a placement of the sensor unit in a box for transport or a transport in a transportation container, and a dynamic light intensity may represent a packing in a box, an unpacking from a box, or a transport within a building.

Figure 4B:
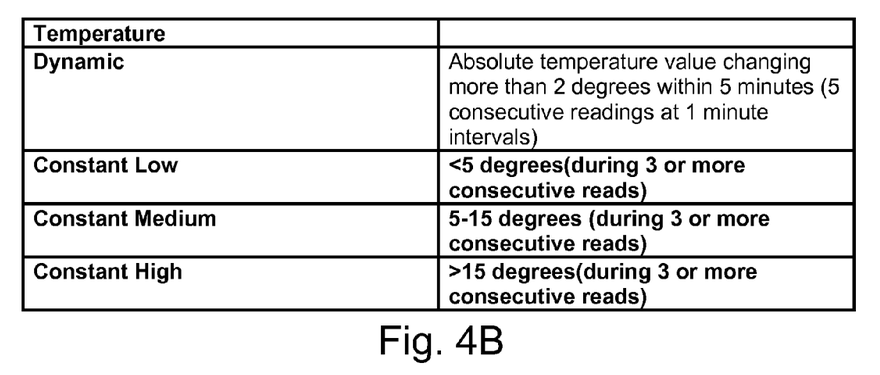
FIG. 4B is a table with an example classification of temperature values.

FIG. 4B is a table with an example classification of temperature values. Such a classification has classification values for the temperature that may be used as segment values. The segment values may represent consecutive temperature values of sensor data. The classification may be used for sensor data of a plurality of sensor units during a learning phase or for sensor data of a sensor unit that is used in a counterfeit detection check. In an example, when measurements do not comply with the classification values, classification values may be selected that describe the measurements in the closest way.

Figure 4C:
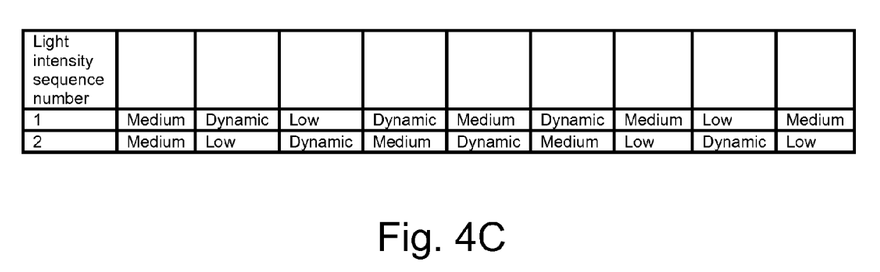
FIG. 4C is a table with two example sequences of segment values in a transport profile.

FIG. 4C is a table with two example sequences of segment values in a transport profile. The segment values may be light intensity segment values according to the classification of light intensity values (see FIG. 4A). The sequences may have been computed from sensor data of a plurality of sensor units during a learning phase of the counterfeit detection system 100. In an example, sensor data of 10,000 sensor units may have been processed and the sequence with number 1 may represent sensor data of 9000 sensor units and the sequence with number 2 may represent sensor data of 800 sensor units.

The light intensity values of the sensor data of a sensor unit that is used in a counterfeit detection check may be transformed into a representation by using segment values in accordance with the light intensity classification. The representation may have more or less segment values than sequences of the transport profile or may have different segment values. In an example, one additional or one missing segment value may be counted as one differing value. Following representative values and segment values may then be compared and differing values may be summed up to give a final result of differing values. In an example, a difference of two or less segment values between the representation and sequence with number 1 and sequence with number 2 may be an acceptable deviation. Accordingly, the resulting estimate value may say that the corresponding product is probably authentic, that is, non-counterfeited. In a further example, the number of acceptable differences may depend on the segment values: a difference between a medium segment value and a low segment value may be more acceptable than a difference between a high segment value and a low segment value. In a further example, an edit-distance may be defined and computed for the representative values and the segment values. The computed edit-distance may be compared to a certain threshold value to determine if the product is authentic or counterfeit. Using an edit-distance an additional or missing value may be counted as one differing value without affecting a comparison of following values.

Figure 5:
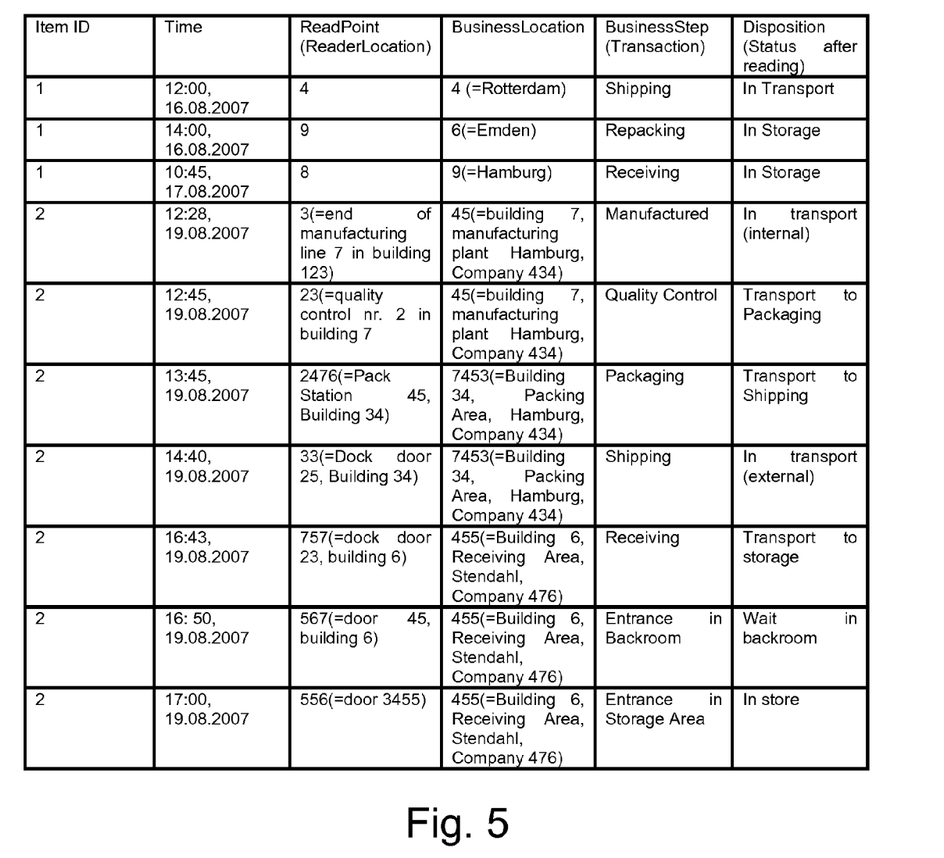
FIG. 5 is a table with example events of two items.

FIG. 5 is a table with example events of two items. The events may be part of track and trace data that are accessible through an infrastructure such as the EPC global network. In an example, the events may be recorded by a RFID reader device that reads RFID tags when the item with the RFID tag passes the reader device. In a further example, the events may be recorded by bar code reader devices or by manual input.

Each event may include an item identifier (ID), a timestamp when the reading is done, location specifications such as ReadPoint and BusinessLocation, and event type specifications such as BusinessStep and Disposition. In an example, the recorded event history of items may be coarse as for item with ID 1 or fine-granular as for item with ID 2.

In an example, all the example events in the table may be used as events of the transport path of the respective items and may be used to define segments of the transport path. This means that for item with ID 1 there are two segments and the segment values for the two segments may be computed using average values for each segment or classifications of the values (similar to FIG. 4A or FIG. 4B). Following a transformation of the sensor data of a sensor unit associated with the item with ID 1 into a sequence of two segment values, the two segment values may be compared one by one to segment values of a transport profile. The transport profile may have been identified for example by the item ID that specifies a product type such as "Aspirin 500 mg" to which the transport profile is assigned. Acceptable deviations also may be part of the transport profile that may have been obtained in a learning phase. In an example, the learning phase of the transport profile may be active when detection checks for counterfeit products are executed with the transport profile. In such a case, the transport profile may be constantly updated to account for changes in transport paths of products. In an example, using new sensor data to recompute the transport profile data may be accompanied by ignoring old sensor data of one or more sensor units. In an example, a completely new transport path may be added to the transport profile by a user with the user interface 130 (see FIG. 1) when the completely new transport path is legitimate or from authentic products.

Figure 6:
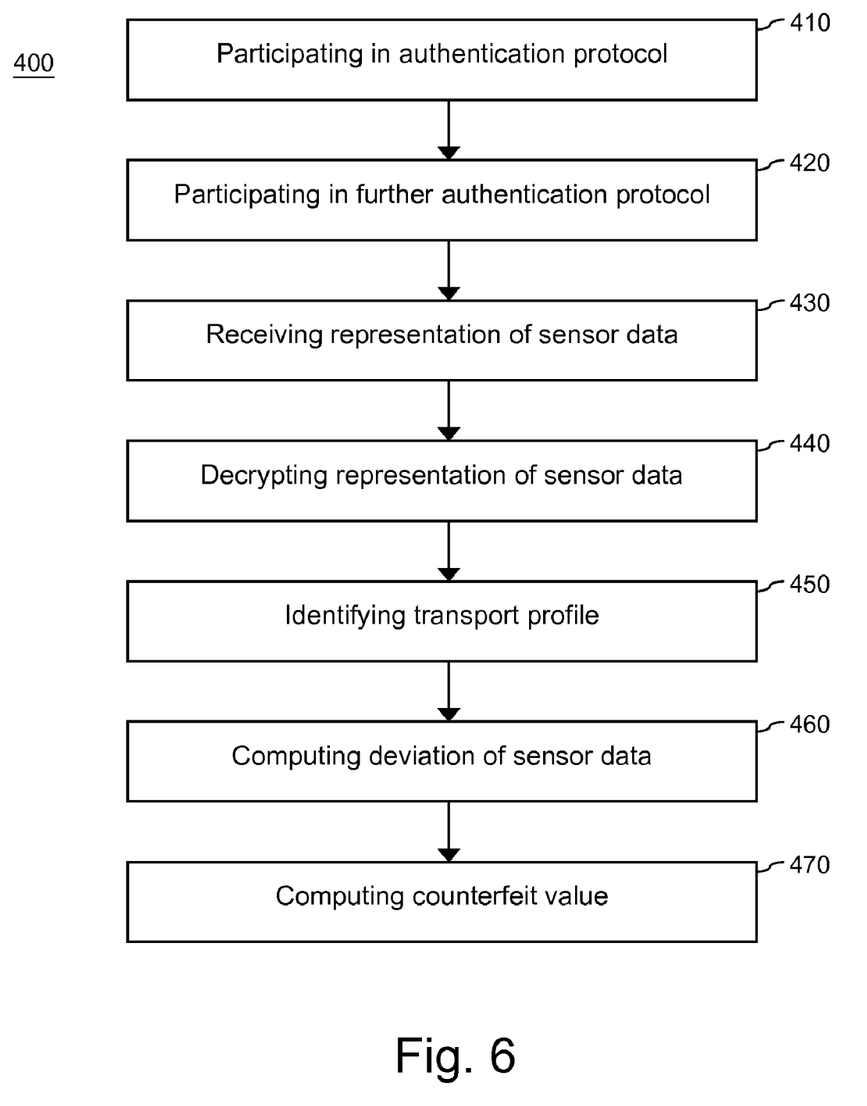
FIG. 6 is flow diagram of an example method according to an embodiment.

FIG. 6 is flow diagram of an example method 400 according to an embodiment. The method 400 may be a computer-implemented method 400 for detecting counterfeit products. Operations of the method 400 may be executed in an order that is different from the order of the method 400. Different operations of the method 400 may even be executed in parallel. In a different example, a method may execute fewer operations than the method 400 and still be according to an embodiment.

The method 400 may include participating 410 in an authentication protocol with the sensor unit 220 (see FIG. 1). This may include receiving challenge data from the sensor unit 220, generating response data with a cryptographic function from the challenge data and an identifier of a secret key (that may be identical to the secret key) accessible to the sensor unit 220, and sending the response data to the sensor unit 220.

The method 400 may include participating 420 in a further authentication protocol with the sensor unit 220. This may include sending further challenge data to the sensor unit 220, receiving further response data from the sensor unit 220, and verifying that the further response data are generated with a further cryptographic function from the further challenge data and an identifier of a further secret key accessible to the sensor unit 220.

A method operation receiving 430 a representation of sensor data may follow. The sensor data may be measured at different times by a sensor unit 220 associated with the product 230 (see FIG. 1).

Decrypting 440 the representation of the sensor data may follow. Decrypting 440 may include using a key of an encryption system. The representation of the sensor data may be an encryption of the sensor data generated by the sensor unit 220 from the sensor data with a secret key of the encryption system.

The method 400 may include identifying 450 the transport profile by identifying a class representing the product 230 and by using an assignment of the transport profile to the class. The class may be any one of the following classes: a class assigned to a product type of the product 230, a class assigned to one or more locations of a transport path of the product 230, a class assigned to an authentication requester having read the sensor data from the sensor unit 220, a class assigned to manufacture data of the product 230, and a class assigned to one or more events of the transport path of the product 230. The events may have attributes such as location, transaction, disposition, or time of the day of the transport path. A class may also be defined by a combination of more than one of the attributes. The events may be recorded by a radio frequency identifier reader device reading a tag associated with the product 230.

The method 400 may include computing 460 a deviation of the sensor data from data of a transport profile for the product 230 and computing 470 from the deviation a counterfeit value. The counterfeit value may represent an estimate value for the probability that the product 230 is counterfeited.

In an example, computing 460 the deviation may include comparing the sensor data to a threshold value of the transport profile. Accordingly, computing 470 the counterfeit value may include specifying a first counterfeit value qualifying the product 230 as possibly counterfeited when the sensor data is non-compliant with the threshold value. The threshold value may be any one of the following values: a minimum value for the sensor data, a maximum value for the sensor data, a minimum value for the average of the sensor data, and a maximum value for the average of the sensor data. Computing the threshold value may include receiving sensor data of a plurality of sensor units and identifying the threshold value with (or by computing) a statistical value based on the sensor data of the plurality of sensor units.

In a further example, computing 460 the deviation may include comparing a mapping of the sensor data to mapping values of the transport profile. Accordingly, computing 470 the counterfeit value may include specifying a second counterfeit value qualifying the product 230 as possibly counterfeited when the differences between mapped sensor data and the mapping values of the transport profile are outside a predefined range. Computing the mapping values may include receiving sensor data of a plurality of sensor units and identifying each one of the mapping values with a mapped average value of the sensor data of the plurality of sensor units.

In a still further example, computing 460 the deviation may include comparing representative values of consecutive values of the sensor data to segment values of the transport profile. Accordingly, computing 470 the counterfeit value may include specifying a third counterfeit value qualifying the product 230 as possibly counterfeited when a predefined number of differing representative values and segment values is reached or an edit-distance based measure is greater than a certain threshold. Computing the segment values may include receiving sensor data of a plurality of sensor units and identifying each one of the segment values with a value configured to represent consecutive values of sensor data of each sensor unit of the plurality of sensor units. In an example, computing a segment may include receiving events of a transport path of a sample product and defining a segment as being limited by two events of the transport path. The events may be recorded by a radio frequency identifier reader device reading a tag associated with the sample product. In an example, different operations for computing 460 the deviation and computing 470 the counterfeit value may be combined to give a final counterfeit value with a high reliability.

Figure 7:
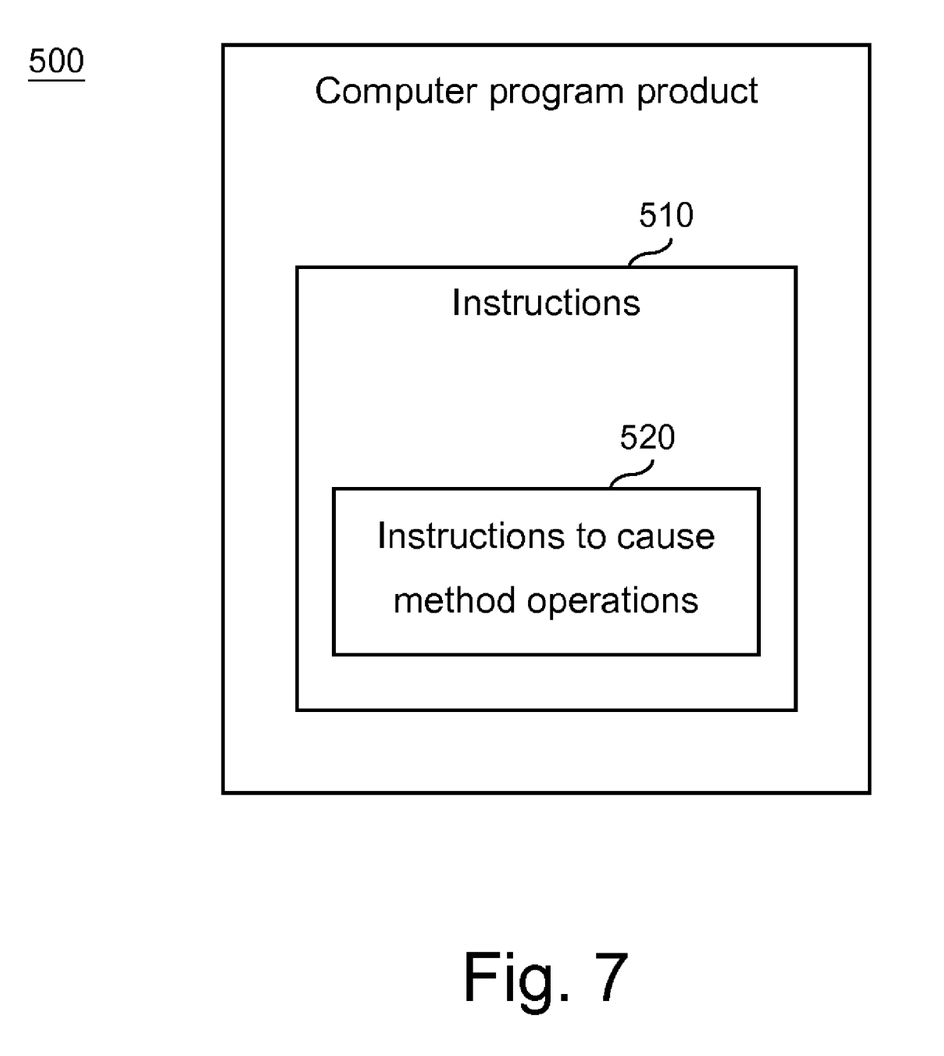
FIG. 7 is block diagram of an example computer program product according to an embodiment.

FIG. 7 is block diagram of an example computer program product 500 according to an embodiment. The computer program product 500 may be used for detecting counterfeited products. The computer program product 500 may include instructions 510 that may be loaded into a memory of a computer system and cause operations of the computer system. The instructions 510 may include instructions 520 that are configured to cause such a computer system to execute operations of the method 400 (see FIG. 6) or of a method according to an embodiment.

In an example, the computer program product 500 may include instructions of a communication module to receive a representation of sensor data being measured at different times by the sensor unit 220 (see FIG. 1) associated with a product 230 (see FIG. 1). Furthermore, the computer program product 500 may include instructions of a processing module to compute a deviation of the sensor data from data of a transport profile for the product 230 and to compute from the deviation a counterfeit value. The counterfeit value may represent an estimate value for the probability that the product 230 is counterfeited.

The computer program products may be stored on computer-readable media for carrying or having computer-executable instructions or data structures. Such computer-readable media may be any available media that can be accessed by a general purpose or special purpose computer. By way of example, such computer-readable media may include RAM, ROM, EPROM, EEPROM, CD-ROM or other optical disk storage, magnetic disk storage or other magnetic storage devices, or any other medium that may be used to carry or store desired program code in the form of computer-executable instructions or data structures and which can be accessed by a general purpose or special purpose computer. Combinations of the above are also to be included within the scope of computer-readable media. Computer-executable instructions include, for example, instructions and data which cause a general purpose computer, a special purpose computer, or a special purpose processing device to perform a certain function or group of functions. Furthermore, computer-executable instructions include, for example, instructions that have to be processed by a computer to transform the instructions into a format that is executable by a computer. The computer-executable instructions may be in a source format that is compiled or interpreted to obtain the instructions in the executable format. When the computer-executable instructions are transformed, a first computer may for example transform the computer-executable instructions into the executable format and a second computer may execute the transformed instructions. The computer-executable instructions may be organized in a modular way so that a part of the instructions may belong to one module and a further part of the instructions may belong to a further module. However, the differences between different modules may not be obvious and instructions of different modules may be intertwined.

Example embodiments have been described in the general context of method operations, which may be implemented in one embodiment by a computer program product including computer-executable instructions, such as program code, executed by computers in networked environments. Generally, program modules include for example routines, programs, objects, components, or data structures that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such operations.

Some embodiments may be operated in a networked environment using logical connections to one or more remote computers having processors. Logical connections may include for example a local area network (LAN) and a wide area network (WAN). The examples are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, handheld devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, hardware implementations, or equipment for receiving manual inputs.

What is claimed is:

1. A computer system for detecting counterfeited products, the system comprising:
    a communication unit configured to receive a representation of sensor data being measured at different times by a sensor unit associated with a product, wherein the sensor data comprises measurements of physical quantities and positioning data; and
    a processing unit configured to:
        compute a first deviation of the sensor data from data of a transport profile for the product by comparing the sensor data to a threshold value of the transport profile,
        compute from the first deviation a first counterfeit value to indicate whether the product is counterfeited when the sensor data is non-compliant with the threshold value;
        compute a second deviation of the sensor data by comparing a mapping of the sensor data to mapping values of the transport profile;
        compute from the second deviation a second counterfeit value to indicate whether the product is counterfeited when differences between the mapped sensor data and the mapping values of the transport profile are outside a predefined range;
        compute a third deviation of the sensor data by comparing representative values of consecutive values of the sensor data to segment values of the transport profile; and
        compute from the third deviation a third counterfeit value to indicate whether the product is counterfeited when a predefined number of differing representative values and segment values is reached.

2. The system of claim 1 wherein the processing unit is further configured to identify the transport profile by identifying a class representing the product and by using an assignment of the transport profile to the class.

3. The system of claim 2 wherein the class is any one of the following classes: a class assigned to a product type of the product, a class assigned to one or more locations of a transport path of the product, a class assigned to an authentication requester having read the sensor data from the sensor unit, a class assigned to manufacture data of the product, and a class assigned to one or more events of the transport path of the product, the events being recorded by a radio frequency identifier reader device reading a tag associated with the product.

4. The system of claim 1 wherein the threshold value is any one of the following values: a minimum value for the sensor data, a maximum value for the sensor data, a minimum value for the average of the sensor data, and a maximum value for the average of the sensor data.

5. The system of claim 1 wherein the processing unit is further configured to compute the threshold value by receiving sensor data of a plurality of sensor units and by identifying the threshold value with a statistical value of the sensor data of the plurality of sensor units.

6. The system of claim 1 wherein the processing unit is further configured to compute the mapping values by receiving sensor data of a plurality of sensor units and by identifying each one of the mapping values with a mapped average value of the sensor data of the plurality of sensor units.

7. The system of claim 1 wherein the processing unit is further configured to compute the segment values by receiving sensor data of a plurality of sensor units and by identifying each one of the segment values with a value configured to represent consecutive values of sensor data of each sensor unit of the plurality of sensor units.

8. The system of claim 1 wherein the processing unit is further configured to compute a segment by accessing data describing events of a transport path of a sample product and by defining a segment as being limited by two events of the transport path, the data describing events being recorded by a radio frequency identifier reader devices reading a tag associated with the sample product.

9. The system of claim 1 wherein the processing unit is further configured to decrypt the representation of the sensor data with a key of an encryption system, the representation of the sensor data being an encryption of the sensor data generated by the sensor unit from the sensor data with a secret key of the encryption system.

10. The system of claim 1 wherein the processing unit is further configured to participate in an authentication protocol with the sensor unit by receiving challenge data from the sensor unit, by generating response data with a cryptographic function from the challenge data and an identifier of a secret key accessible to the sensor unit, and by sending the response data to the sensor unit.

11. The system of claim 10 wherein the processing unit is further configured to participate in a further authentication protocol with the sensor unit by sending further challenge data to the sensor unit, by receiving further response data from the sensor unit, and by verifying that the further response data are generated with a further cryptographic function from the further challenge data and an identifier of a further secret key accessible to the sensor unit.

12. The system of claim 1 wherein the processing unit is configured to weight and combine first counterfeit value, the second counterfeit value and the third counterfeit value to indicate whether the product is counterfeited.

13. A computer-implemented method for detecting counterfeit products, the method comprising:
receiving a representation of sensor data being measured at different times by a sensor unit associated with a product, wherein the sensor data comprises measurements of physical quantities and positioning data;
computing a first deviation of the sensor data from data of a transport profile for the product by comparing the sensor data to a threshold value of the transport profile;
computing from the first deviation a first counterfeit value to indicate whether the product is counterfeited when the sensor data is non-compliant with the threshold value;
computing a second deviation of the sensor data by comparing a mapping of the sensor data to mapping values of the transport profile;
computing from the second deviation a second counterfeit value to indicate whether the product is counterfeited when differences between the mapped sensor data and the mapping values of the transport profile are outside a predefined range;
computing a third deviation of the sensor data by comparing representative values of consecutive values of the sensor data to segment values of the transport profile; and
computing from the third deviation a third counterfeit value to indicate whether the product is counterfeited when a predefined number of differing representative values and segment values is reached.

14. The method as in claim 13 further comprising identifying the transport profile by identifying a class representing the product and by using an assignment of the transport profile to the class.

15. The method as in claim 14 wherein the class is any one of the following classes: a class assigned to a product type of the product, a class assigned to one or more locations of a transport path of the product, a class assigned to an authentication requester having read the sensor data from the sensor unit, a class assigned to manufacture data of the product, and a class assigned to one or more events of the transport path of the product, the events being recorded by a radio frequency identifier reader device reading a tag associated with the product.

16. The method as in claim 13 wherein the threshold value is any one of the following values: a minimum value for the sensor data, a maximum value for the sensor data, a minimum value for the average of the sensor data, and a maximum value for the average of the sensor data.

17. The method as in claim 13 further comprising computing the threshold value by receiving sensor data of a plurality of sensor units and by identifying the threshold value with a statistical value of the sensor data of the plurality of sensor units.

18. The method as in claim 13 further comprising computing the mapping values by receiving sensor data of a plurality of sensor units and by identifying each one of the mapping values with a mapped average value of the sensor data of the plurality of sensor units.

19. The method as in claim 13 further comprising computing the segment values by receiving sensor data of a plurality of sensor units and by identifying each one of the segment values with a value configured to represent consecutive values of sensor data of each sensor unit of the plurality of sensor units.

20. The method as in claim 13 further comprising computing a segment by receiving data describing events of a transport path of a sample product and by defining a segment as being limited by two events of the transport path, the data describing events being recorded by radio frequency identifier reader devices reading a tag associated with the sample product.

21. The method as in claim 13 further comprising decrypting the representation of the sensor data with a key of an encryption system, the representation of the sensor data being an encryption of the sensor data generated by the sensor unit from the sensor data with a secret key of the encryption system.

22. The method as in claim 13 further comprising participating in an authentication protocol with the sensor unit by receiving challenge data from the sensor unit, by generating response data with a cryptographic function from the challenge data and an identifier of a secret key accessible to the sensor unit, and by sending the response data to the sensor unit.

23. The method as in claim 22 further comprising participating in a further authentication protocol with the sensor unit by sending further challenge data to the sensor unit, by receiving further response data from the sensor unit, and by verifying that the further response data are generated with a further cryptographic function from the further challenge data and an identifier of a further secret key accessible to the sensor unit.

24. The method as in claim 13 further comprising weighting and combining the first counterfeit value, the second counterfeit value and the third counterfeit value to indicate whether the product is counterfeited.

25. A computer program product for detecting counterfeited products, the computer program product being tangibly embodied on a computer-readable medium and comprising executable instructions that, when executed, are configured to cause a computer system to:

receive a representation of sensor data being measured at different times by a sensor unit associated with a product, wherein the sensor data comprises measurements of physical quantities and positioning data;

compute a first deviation of the sensor data from data of a transport profile for the product, by comparing the sensor data to a threshold value of the transport profile;

compute from the first deviation a first counterfeit value to indicate whether the product is counterfeited when the sensor data is non-compliant with the threshold data;

compute a second deviation of the sensor data by comparing a mapping of the sensor data to mapping values of the transport profile;

compute from the second deviation a second counterfeit value to indicate whether the product is counterfeited when differences between the mapped sensor data and the mapping values of the transport profile are outside a predefined range;

compute a third deviation of the sensor data by comparing representative values of consecutive values of the sensor data to segment values of the transport profile; and compute from the third deviation a third counterfeit value to indicate whether the product is counterfeited when a predefined number of differing representative values and segment values is reached.

26. The computer program product of claim 25 further comprising executable instructions that, when executed, are configured to cause a computer system to weight and combine first counterfeit value, the second counterfeit value and the third counterfeit value to indicate whether the product is counterfeited.

\* \* \* \* \*